United States Patent
Bialer et al.

(10) Patent No.: US 11,726,202 B2
(45) Date of Patent: Aug. 15, 2023

(54) NEURAL NETWORK-BASED RADIO FREQUENCY NETWORK DESIGN IN A RADAR SYSTEM OF A VEHICLE

(71) Applicant: GM Global Technology Operations LLC, Detroit, MI (US)

(72) Inventors: Oded Bialer, Petah Tivak (IL); Noa Garnett, Herzliya (IL); Amnon Jonas, Jerusalem (IL); Ofer Givati, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 341 days.

(21) Appl. No.: 17/117,266

(22) Filed: Dec. 10, 2020

(65) Prior Publication Data

US 2022/0187446 A1    Jun. 16, 2022

(51) Int. Cl.
| | | |
|---|---|---|
| G01S 13/931 | (2020.01) | |
| G01S 13/18 | (2006.01) | |
| G01S 7/40 | (2006.01) | |
| G06N 3/08 | (2023.01) | |

(52) U.S. Cl.
CPC .......... G01S 13/931 (2013.01); G01S 7/4004 (2013.01); G01S 13/18 (2013.01); G06N 3/08 (2013.01); *G01S 2013/9325* (2013.01); *G01S 2013/9327* (2020.01)

(58) Field of Classification Search
CPC ...... G01S 13/931; G01S 7/4004; G01S 13/18; G01S 2013/9327; G01S 2013/9325; G06N 3/08
See application file for complete search history.

(56) References Cited

U.S. PATENT DOCUMENTS

| | | | |
|---|---|---|---|
| 2012/0064841 A1* | 3/2012 | Husted | H04B 7/086 455/78 |
| 2021/0242577 A1* | 8/2021 | Yamaura | G01S 7/03 |

\* cited by examiner

*Primary Examiner* — Peter M Bythrow
*Assistant Examiner* — Nazra Nur Waheed
(74) *Attorney, Agent, or Firm* — Cantor Colburn LLP

(57) ABSTRACT

A method of designing a radar system includes implementing a supervised learning process of a neural network to determine a weight corresponding with each of a plurality of patch antennas of a radar system. Each of the plurality of patch antennas is sized in accordance with the weight.

20 Claims, 4 Drawing Sheets

NEURAL NETWORK-BASED RADIO FREQUENCY NETWORK DESIGN IN A RADAR SYSTEM OF A VEHICLE

INTRODUCTION

The subject disclosure relates to a neural network-based radio frequency (RF) network design in a radar system of a vehicle.

Vehicles (e.g., automobiles, trucks, construction equipment, farm equipment, automated factory equipment) increasingly include sensors to obtain information about the vehicle and its surroundings. The information facilitates semi-autonomous and autonomous operation of the vehicle, for example. Exemplary sensors include cameras, light detection and ranging (lidar) systems, and radio detection and ranging (radar) systems. A radar system may include an RF network with a number of patch antennas to receive reflected energy resulting from the reflection of transmitted energy by one or more objects in the field of view of the radar system. The RF network also includes components to process the reflected energy prior to additional processing. Accordingly, it is desirable to provide a neural network-based RF network design in a radar system of a vehicle.

SUMMARY

In one exemplary embodiment, a method of designing a radar system includes implementing a supervised learning process of a neural network to determine a weight corresponding with each of a plurality of patch antennas of a radar system. Each of the plurality of patch antennas is sized in accordance with the weight.

In addition to one or more of the features described herein, the implementing the supervised learning process also determines a feedline weight corresponding with each of a plurality of radio frequency (RF) feedlines used in combining outputs of the plurality of patch antennas within an RF network of the radar system. A relative thickness of each of the plurality of RF feedlines is determined in accordance with the feedline weight.

In addition to one or more of the features described herein, the implementing the supervised learning process includes obtaining a weighted output from each of a plurality of representative patch antennas that represent the plurality of patch antennas of the radar system based on a selected weight associated with each of the plurality of representative patch antennas. The selected weight for a last iteration of the supervised learning process is the weight corresponding with each of the plurality of patch antennas of the radar system.

In addition to one or more of the features described herein, the implementing the supervised learning process includes adding the weighted output from two or more of the plurality of representative patch antennas to obtain a sum for each set of the two or more of the plurality of representative patch antennas, performing a non-linear operation on each sum to obtain a non-linear output, weighting each non-linear output as a weighted non-linear output based on a selected feedline weight associated with each representative RF feedline at an output of each non-linear operation, the selected feedline weight for the last iteration of the supervised learning process being the feedline weight corresponding with each of the plurality of RF feedlines of the RF network of the radar system.

In addition to one or more of the features described herein, the implementing the supervised learning process includes performing one or more additional levels of combination that include performing an addition of the weighted non-linear output resulting from two or more of the non-linear operations, performing a next non-linear operation on a result of the addition, and providing a weighted result of the next non-linear operation to by selecting additional feedline weights to ultimately provide one or more outputs of the RF network.

In addition to one or more of the features described herein, the implementing the supervised learning process includes obtaining a baseband signal from one or more down-converters. Each of the one or more down-converters obtains one of the one or more outputs of the RF network.

In addition to one or more of the features described herein, the implementing the supervised learning process includes further processing the baseband signal from each of the one or more down-converters to obtain a location of one or more objects whose reflected energy is part of the weighted output from each of the plurality of representative patch antennas.

In addition to one or more of the features described herein, the weighted output, including the reflected energy, from each of the plurality of representative patch antennas is simulated as part of the supervised learning process.

In addition to one or more of the features described herein, the further processing includes filtering, amplifying, and converting using an analog-to-digital converter.

In addition to one or more of the features described herein, the further processing includes using a detection neural network.

In addition to one or more of the features described herein, the implementing the supervised learning process includes obtaining ground truth data indicating the actual location of the one or more objects.

In addition to one or more of the features described herein, the implementing the supervised learning process includes obtaining a loss by comparing the actual location with the location obtained based on the further processing.

In addition to one or more of the features described herein, the implementing the supervised learning process includes updating each selected weight and each selected feedline weight at each iteration over a number of iterations, the number of iterations being based on the loss.

In another exemplary embodiment, a radar system includes a plurality of patch antennas that are part of a radio frequency (RF) network of the radar system. A relative size of each of the plurality of patch antennas is non-uniform and is based on a supervised learning process implemented by a neural network. The radar system also includes processing circuitry to detect and locate one or more objects based on reflected signals received by the plurality of patch antennas.

In addition to one or more of the features described herein, the radar system also includes a plurality of RF feedlines that are part of the RF network and feed modules to combine outputs from two or more of the plurality of patch antennas to ultimately provide one or more RF network outputs. A thickness of each of the plurality of RF feedlines is non-uniform and is based on the supervised learning process implemented by the neural network.

In addition to one or more of the features described herein, the radar system also includes one or more down-converters, each of the one or more down-converts provides a baseband signal based on one of the one or more RF network outputs.

In addition to one or more of the features described herein, the radar system also includes one or more digital channels. Each of the one or more digital channels includes a power amplifier, a filter, and an analog-to-digital converter and corresponds with one of the one or more down-converters to provide a digital signal based on the baseband signal output by the one of the one or more down-converters.

In addition to one or more of the features described herein, the processing circuitry obtains the location of each of the one or more objects based on the digital signal from each of the one or more digital channels.

In addition to one or more of the features described herein, the processing circuitry implements a second neural network to detect and locate the one or more objects and parameters of the second neural network are updated as part of the supervised learning process implemented by the neural network.

In addition to one or more of the features described herein, the radar system is disposed in a vehicle, and the location of each of the one or more objects provided by the radar system is used to control an operation of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
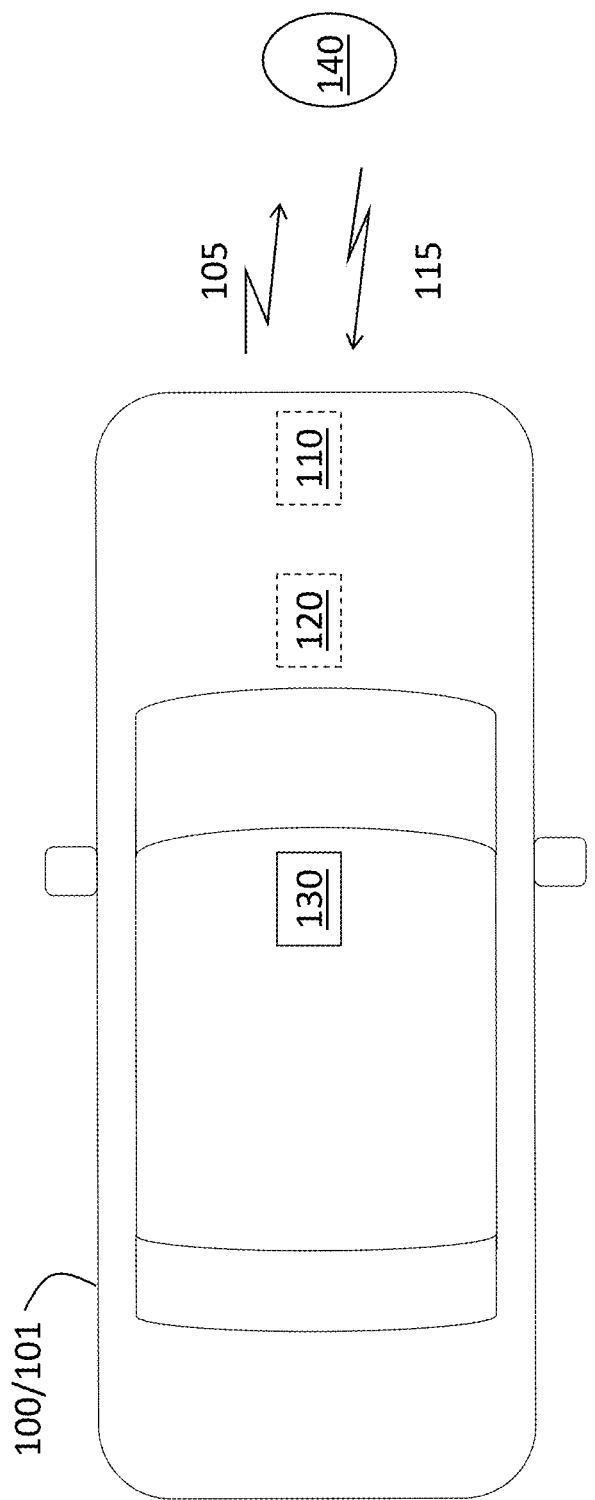
FIG. 1 is a block diagram of a vehicle with a radar system that includes a neural network-based radio frequency (RF) network design according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system is one of the exemplary sensors that may be used to obtain information in a vehicle. A set of patch antennas may be used to receive reflected energy from one or more objects that reflect transmitted energy emitted from the radar system. An increased number of the patch antennas increases the signal to noise ratio and extends the maximum detectable range. An increased number of the patch antennas also provides a larger antenna array dimension and, thus, increases angular resolution of the radar system. However, the receiver front-end components that perform processes such as down-conversion of the received reflection frequency to a baseband frequency and analog-to-digital conversion are costly and, thus, limited in number. Each set of these components may be referred to as a receive channel. The output of one or more receive channels is provided to a digital channel for further processing. Each digital channel provides output to the same processor, which obtains information about the objects that generated the reflections.

Because the number of patch antennas generally is greater than the number of receive channels, energy received by more than one patch antenna may be combined and provided to one receive channel. In prior approaches, a linear combination of signals at a set of patch antennas is provided to each receive channel. However, the linear combination may result in poor angular resolution of detected objects. Embodiments of the systems and methods detailed herein relate to a neural network-based RF network design. The RF network refers to the patch antennas and the components used to combine the energy received from two or more patch antennas prior to additional processing including by a corresponding digital channel. A neural network is used in the design of the radar system. Specifically, a weighting is determined for each patch antenna using the neural network. That weighting is used to physically size the patch antennas (i.e., determine dimensions of the patch antennas) such that a linear combination of the energy received by each will result in a weighted combination. Additionally, a weighting is determined for RF feedlines (i.e., RF wires) used in combining the patch antenna outputs. The weighting is used to determine the physical thickness of the feedlines used in the RF network.

In accordance with an exemplary embodiment, FIG. 1 is a block diagram of a vehicle 100 with a radar system 110 that includes a neural network-based RF network design. The exemplary vehicle 100 shown in FIG. 1 is an automobile 101. The vehicle 100 includes a radar system 110 and may include other sensors 130 (e.g., cameras, lidar system). Generally, the radar system 110 emits a transmitted signal 105. When that transmitted signal 105 encounters one or more objects 140 (e.g., car, pedestrian, building), the one or more objects 140 reflect some energy from that transmitted signal 105 back as reflected energy 115. The numbers and positions of the radar system 110 and other sensors 130 are not limited by the exemplary illustration in FIG. 1. A controller 120 obtains information from the radar system 110 and one or more other sensors 130 to perform semi-autonomous or autonomous operation of the vehicle 100.

The neural network-based RF network design may be performed by a controller of the radar system 110, an external controller, the controller 120 or a combination. Each includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
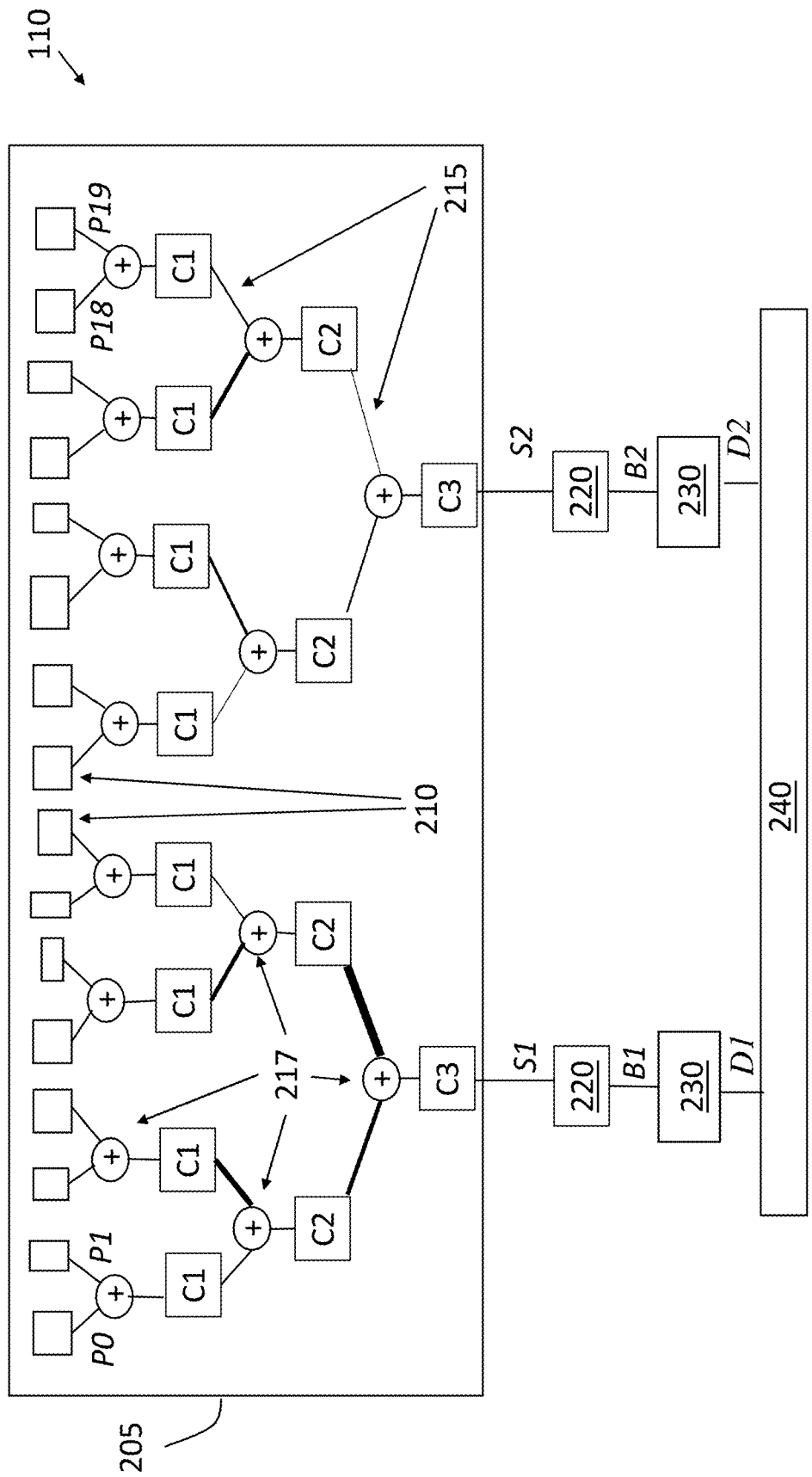
FIG. 2 details aspects of an exemplary radar system resulting from a neural network-based RF network design according to one or more embodiments.
Figure 4:
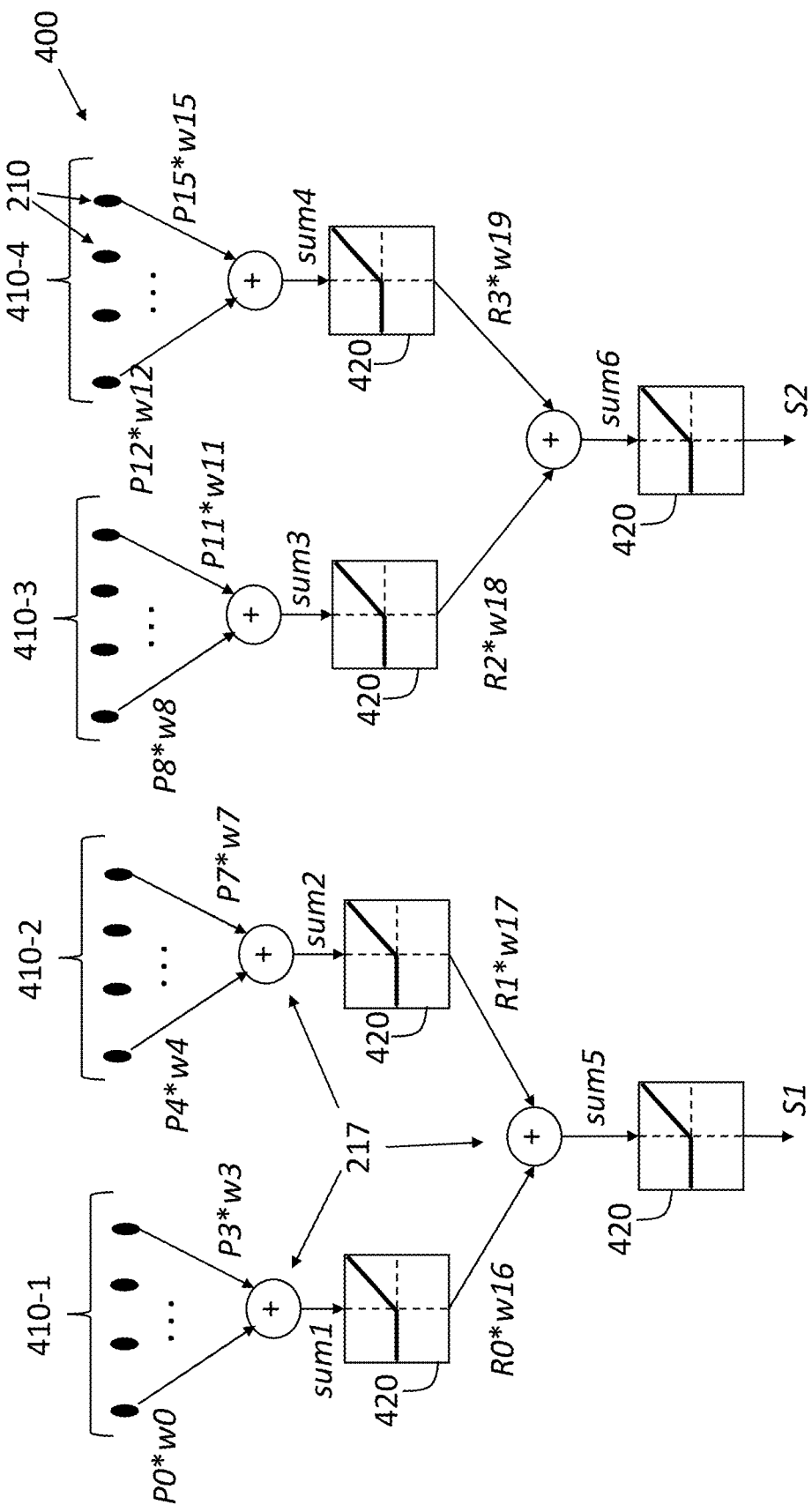
FIG. 4 illustrates processes of the method shown in FIG. 3.

FIG. 2 details aspects of an exemplary radar system 110 that results from a neural network-based RF network design according to one or more embodiments. A number of patch antennas 210 are shown in FIG. 2. These patch antennas 210 are part of the RF network 205 of the radar system 110. The RF network 205 also includes additional components C1, C2, C3 that are used to combine reflected energy 115 received by two or more patch antennas 210. These are further discussed with reference to an exemplary mathematical representation 400 shown in FIG. 4. To be clear, the exemplary mathematical representation 400 shown in FIG. 4 is not a representation of the exemplary radar system 110 shown in FIG. 2. Differences between the exemplary radar system 110 shown in FIG. 2 and the exemplary mathematical representation 400 shown in FIG. 4 are used to illustrate that the number of combinational levels may differ. That is, three levels of combination (i.e., three levels of summation modules 217) are shown for the exemplary radar system 110 in FIG. 2, while two levels of combination (i.e., two levels of summation modules 217) are shown for the exemplary mathematical representation 400 in FIG. 4.

As shown in FIG. 2, the size of each of the patch antennas 210 is not uniform in the exemplary radar system 110. In addition, RF feedlines 215 that facilitate the combinations at different levels (i.e., RF feedlines 215 that feed into a summation module 217) have non-uniform thicknesses. The neural-network based process that is used to determine the relative size of each of the patch antennas 210 as well as to determine the relative thickness of each of the RF feedlines 215 is further discussed with reference to FIG. 3 and uses a mathematical representation 400, similar in aspects to the mathematical representation 400 shown in FIG. 4, but that corresponds with the radar system 110 shown in FIG. 2. The patch antennas 210 of different sizes and the RF feedlines 215 of different thicknesses, as shown in FIG. 2, are a result of weights that are iteratively determined by the neural network-based RF network design according to one or more embodiments.

As shown in the exemplary case, sixteen patch antennas 210 undergo three levels of combination to result in two outputs from the RF network 205. According to alternate embodiments, the number of patch antennas 210, as well as the number of levels of combination and the number of ultimate outputs, may differ. As previously noted, the number of digital channels 230 is generally the driving factor for the design of the number of outputs from the RF network 205 (i.e., the inputs Si to the down-converters 220). It should be understood that, when one or more additional levels of combination are part of the RF network 205, then one or more additional sets of RF feedlines 215 and summation modules 217 are required. The additional sets of RF feedlines 215 will have relative thicknesses that reflect the weighting determined according to the neural network-based approach.

As previously noted, based on the transmitted signal 105 emitted by the radar system 110, each patch antenna 210 receives some of the resulting reflected energy 115. A larger patch antenna 210 will receive more of the reflected energy 115 than a smaller one. The output Pi (P0 through P15 in the exemplary case of sixteen patch antennas 210) of each patch antenna 210 is combined at three different stages or levels and provided to the corresponding down-converter 220 as input Si. The inputs S1 and S2 are shown in FIG. 2. Based on the different sizes of the patch antennas 210 and the different thicknesses of the RF feedlines 215, the combination of reflected energy 115 in each grouping is effectively a weighted combination. As discussed with reference to FIG. 3, a neural network-based approach is used to determine the weights and the relative weightings associated with each patch antenna 210 and with each RF feedline 215 are used to size each patch antenna 210 and determine the thickness of each RF feedline 215.

Each down-converter 220 converts the frequency of the corresponding input Si to a lower baseband frequency. The frequency of this input Si is on the same order as the frequency of the transmitted signal 105 that gave rise to the reflected energy 115 received at the patch antennas 210 (e.g., in the gigahertz (GHz) range). According to an exemplary embodiment, the down-conversion entails multiplying the input Si with the transmitted signal 105 or another carrier signal with a frequency on the order of the frequency of the transmitted signal 105. The multiplication results in a difference between the frequency of the input Si and the frequency of the transmitted signal 105 or carrier signal. Because these frequencies are both in the GHz range, the difference (i.e., result of the multiplication) will be small (i.e., baseband frequency).

The baseband signal Bi output by each down-converter 220 is further processed by a digital channel 230. In the exemplary embodiment shown in FIG. 2, two digital channels 230 each receive a corresponding one of the baseband signals B1, B2 from the two down-converters 220. The components that are part of each digital channel 230 may include a power amplifier, filter, and analog-to-digital converter. The filter is a low pass filter used to eliminate noise in the baseband signal Bi. Detection of the one or more objects 140 that result in the reflected energy 115 that the patch antennas 210 receive is performed by a processor 240 that receives the output (i.e., digital signal Di) of each digital channel 230. The processor 240 may be part of the radar system 110 or the controller 120, for example. The processor 240 may implement another neural network to perform the detection based on the digital signals Di.

Figure 3:
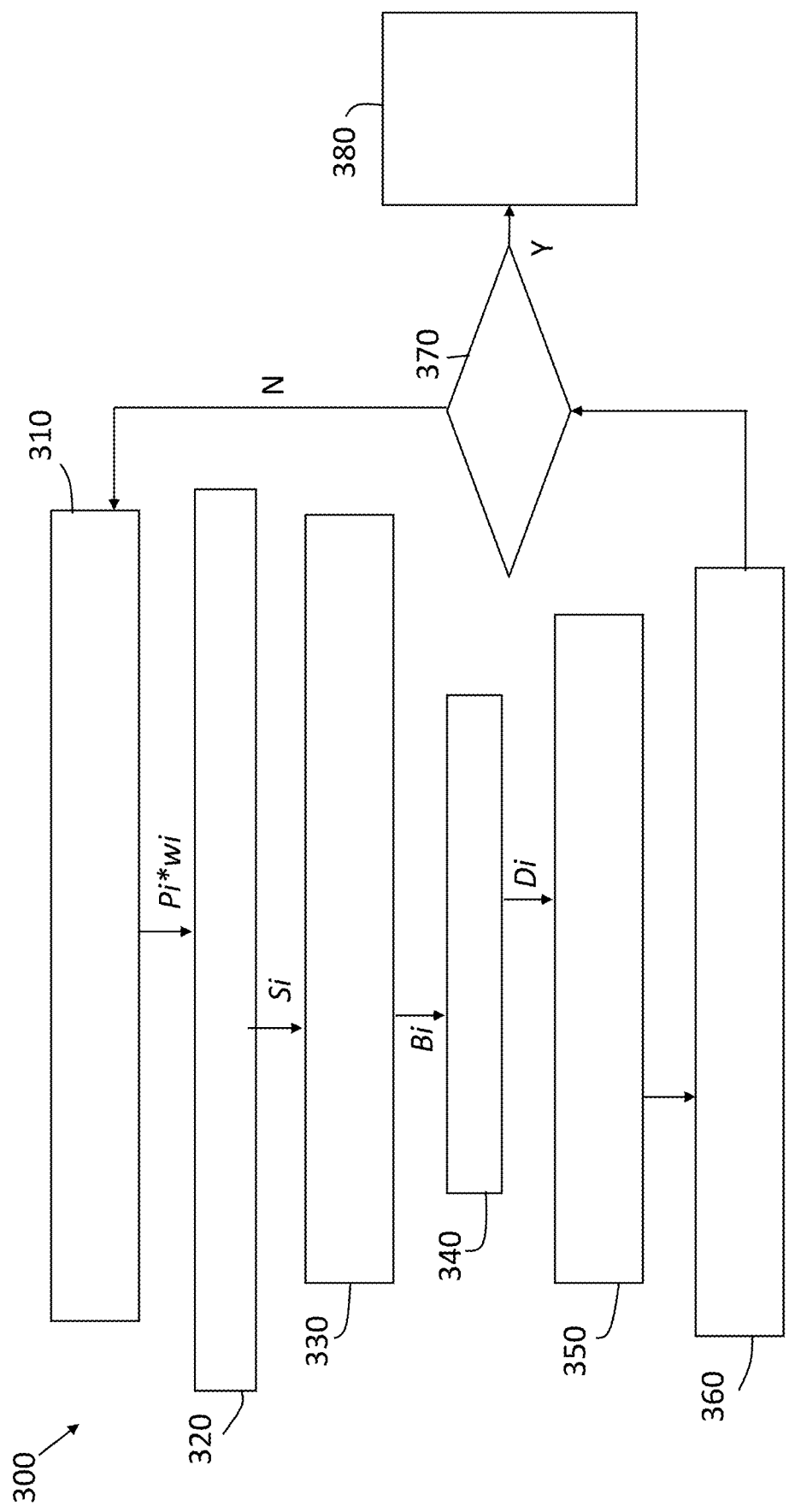
FIG. 3 is a process flow of a method of performing a neural network-based RF network design according to one or more embodiments.

FIG. 3 is a process flow of a method 300 of performing a neural network-based RF network design according to one or more embodiments. The method 300 involves supervised learning to determine a weight applied to an output Pi of each patch antenna 210 and a weight applied to each RF feedline 215 in the RF network 205. These weights then determine relative sizing of patch antennas 210 and RF feedlines 215 in the RF network 205 of the physical radar system 110. The supervised learning may be performed offline prior to the installation of the radar system 110 in the vehicle 100. The number of patch antennas 210 and number of levels of combinations (i.e., the number of levels at which summation modules 217 are included) are determined prior to implementing the method 300 shown in FIG. 3.

At block 310, generating weighted output signals Pi*wi from each of the patch antennas 210 may be simulated according to exemplary embodiments. The weight wi applied to the output Pi of each patch antenna 210 is refined over iterations as detailed herein. At block 320, combining the weighted output signals Pi*wi using weighted RF feedlines 215 results in providing inputs Si to the down-converters 220, as detailed with reference to FIG. 4. Like the weight applied to the output Pi of each patch antenna 210, the weight applied to the output Ri of each RF feedline 215 is also improved over iterations according to the method 300, as detailed.

FIG. 4 illustrates the processes at blocks 310 and 320 and, thus, is discussed in conjunction with their description. That is, FIG. 4 is a mathematical representation 400 of the processes performed by an exemplary RF network 205 to provide the inputs Si to the down-converters 220. Continuing reference is also made to FIGS. 1 and 2 but, to reiterate, the mathematical representation 400 is not that of the exemplary RF network 205 shown in FIG. 2, which includes one more level of combination. According to the exemplary mathematical representation 400, four exemplary subarrays 410-1, 410-2, 410-3, and 410-4 (generally referred to as 410) are shown with four patch antennas 210 each. The patch antennas 210 provide output signals P0 through P15 that are weighted, respectively, by weights w0 through w15. As noted, the neural network-based approach may involve simulating the weighted outputs Pi*wi at block 310. At block 320, the processes include combining the weighted output signals Pi*wi (from block 310) using weighted RF feedlines 215.

In the exemplary case shown in FIG. 4, the weighted outputs Pi*wi of the four patch antennas 210 of each subarray 410 are first summed at four summation modules 217 to obtain sumi (i.e., sum1, sum2, sum3, sum4 in the exemplary case shown in FIG. 4). For example, sum1 is a sum of the weighted outputs of the patch antennas 210 of the first subarray 410-1 (P0*w0+P1*w1+P2*w2+P3*w3). Each sum1 is provided to a rectified linear unit (ReLU) 420. The ReLU 420 output Ri is either the same as its input, if the input is positive, or the ReLU 420 output Ri is zero, if the input is negative. Thus, a ReLU 420 performs a non-linear process on the sum1 to output the Ri. The four exemplary ReLU 420 shown in FIG. 4 output R0, R1, R2, and R3. These are implemented as the additional components C1 implemented at the first combination level, as shown in FIG. 2.

These outputs Ri are respectively weighted with weights w16, w17, w18, and w19, as shown, to reflect relative thickness of the RF feedlines 215 in the corresponding physical radar system 110. The weighted outputs Ri*wi corresponding with each pair of ReLUs 410 is summed at two summation modules 217 to produce sum5 and sum6. These sums, sum5 and sum6, represent a second level of combination. Each of the sums, sum5 and sum6, is provided to another ReLU 420, as shown. These two ReLU 420 represent the additional components C2 implemented at the second combination level. In the exemplary case, there are no more levels of combination, and the output of the two ReLUs 420 provides the inputs Si to the down-converters 220. For example, as shown in FIG. 4, (R0*w16+R1*w17) is provided to an ReLU 420 to obtain S1. As previously noted, the number of levels at which outputs are combined, as well as the number of patch antennas 210 involved in each combination, are not limited by the examples herein. For example, a representation of the exemplary radar system 110 in FIG. 2 would include two patch antennas 210 in each of the subarrays 410 and three levels of ReLUs 410 corresponding to the additional components C1, C2, C3 shown in FIG. 2. As FIG. 4 indicates, weighted input is provided to each summation module 217 at each combinational level. That is, either weighted outputs Pi*wi of the patch antennas 210 or weighted RF feedlines 215 are input to each summation module 217 at each stage.

Returning now to the process flow shown in FIG. 3, at block 330, down-converting the frequency of the inputs Si from the RF network 205 (obtained at block 320) may involve simulating the down-converters 220. In the exemplary case (shown in FIG. 4) in which two inputs S1 and S2 are received by simulating the mathematical representation 400, two down-converters 220 are involved. As previously noted, down-converting the frequency of the inputs Si may involve multiplying each input Si with the transmitted signal 105. In the exemplary embodiment in which the weighted outputs Pi*wi of the patch antennas 210 are simulated, the transmitted signal 105 is the corresponding simulated transmitted signal 105 that results in the simulated outputs Pi. The result of the down-conversion at block 330 is baseband signals Bi, as previously noted. In the exemplary case of two inputs S1 and S2 to the two down-converters 220, two baseband signals B1 and B2 are output.

At block 340, digital channels 230 are implemented (e.g., simulated). As previously described, each digital channel 230 may include a power amplifier, filter, and analog-to-digital converter to process the respective baseband signal Bi. The output digital signals Di are then processed by a processor 240, at block 350. That is, at block 350, the processes include detecting one or more objects 140 and estimating the position (e.g., angle of arrival, range) of each of the detected objects 140. This processing may involve machine learning (i.e., implementation of another neural network). To reiterate, this design process may involve simulated transmit signals 105 and reflected energy 115 to simulate the outputs Pi of the patch antennas 210. Thus, the objects 140 may be simulated, as well.

The process of sizing each patch antenna 210 of the physical radar system 110 involves determining the correct weight to apply to the output Pi of each patch antenna 210 to obtain the weighted outputs Pi*wi at block 310. The relative size of each patch antenna 210 is then designed to match its relative weight. That is, a patch antenna 210 with a lower weight will be sized smaller than a patch antenna 210 with a higher weight, for example. The process of determining the thickness of RF feedlines 215 (at every combinational level) of the physical radar system 110 involves determining the correct weight to apply to the output Ri of each ReLU 420 to obtain the weighted outputs Ri*wi at block 320. As previously noted, additional levels of combinations in the RF network 205 will result in additional weighted outputs Ri*wi at block 320. The relative thickness of each RF feedline 215 is then designed to match its relative weight.

To determine the correct weights, an iterative process (i.e., the supervised learning) is performed by implementing a loss function based on ground truth, at block 360. Ground truth refers to the known position(s) of the object(s) 140. As previously noted, the object(s) 140 may be simulated. Supervised learning requires that the actual position of each object 140 must be known. Then, at block 360, ground truth is compared with the estimated position of each detected object 140 obtained at block 350 (with the weights wi assigned at blocks 310 and 320) to obtain a loss. This loss is compared with the loss for the previous iteration to determine if the loss has stabilized. This would indicate that the improvement or refinement of weights based on additional iterations is negligible. According to an exemplary embodiment in which the detection and position estimation of each object 140 (at block 350) uses a neural network, the iterative process may involve updating parameters of that neural network in addition to updating weights applied to the outputs Pi of the patch antennas 210 (at block 310) and to the outputs Ri of the ReLUs 420 (i.e., to the RF feedlines 215) (at block 320).

Specifically, at block 370, it is determined if the loss is stable or not. Any known neural network training approach may be used at block 370. According to an exemplary embodiment, the iterative process may use the stochastic gradient descent algorithm. According to an alternate embodiment, the loss (from block 360) may be subtracted from the loss obtained (at block 360) in the previous iteration to obtain the difference. This difference may be compared with a predefined (near-zero) value to determine that additional iterations are not needed. As indicated by the check at block 370, the iterations beginning at block 310 with an updating weighting of the outputs Pi of the patch antennas 210 (Pi*wi) and continuing with an updated weighting of outputs Ri the ReLU 420 (Ri*wi) (and also at block 350, according to exemplary embodiments) are repeated until it is determined that the loss determined at block 360 is sufficiently stable. Then, at block 380, sizing the patch antennas 210 and forming the RF feedlines 215 per the weights set at blocks 310 and 320 during the last iteration is performed as part of the fabrication of the physical radar system 110. Arrangement of the radar system 110 in a vehicle 100 may be part of the processes at block 380, as well.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of designing a radar system, the method comprising:
    implementing a supervised learning process of a neural network to determine a weight corresponding with each of a plurality of patch antennas of a radar system and to determine a feedline weight corresponding with each of a plurality of radio frequency (RF) feedlines used in combining outputs of the plurality of patch antennas within an RF network of the radar system, a relative thickness of each of the plurality of RF feedlines being determined in accordance with the feedline weight; and
    sizing each of the plurality of patch antennas in accordance with the weight.

2. The method according to claim 1, wherein the implementing the supervised learning process includes obtaining a weighted output from each of a plurality of representative patch antennas that represent the plurality of patch antennas of the radar system based on a selected weight associated with each of the plurality of representative patch antennas, the selected weight for a last iteration of the supervised learning being the weight corresponding with each of the plurality of patch antennas of the radar system.

3. The method according to claim 2, wherein the implementing the supervised learning process includes adding the weighted output from two or more of the plurality of representative patch antennas to obtain a sum for each set of the two or more of the plurality of representative patch antennas, performing a non-linear operation on each sum to obtain a non-linear output, weighting each non-linear output as a weighted non-linear output based on a selected feedline weight associated with each representative RF feedline at an output of each non-linear operation, the selected feedline weight for the last iteration of the supervised learning being the feedline weight corresponding with each of the plurality of RF feedlines of the RF network of the radar system.

4. The method according to claim 3, wherein the implementing the supervised learning process includes performing one or more additional levels of combination that include performing an addition of the weighted non-linear output resulting from two or more of the non-linear operations, performing a next non-linear operation on a result of the addition, and providing a weighted result of the next non-linear operation by selecting additional feedline weights to ultimately provide one or more outputs of the RF network.

5. The method according to claim 4, wherein the implementing the supervised learning process includes obtaining a baseband signal from one or more down-converters, each of the one or more down-converters obtaining one of the one or more outputs of the RF network.

6. The method according to claim 5, wherein the implementing the supervised learning process includes further processing the baseband signal from each of the one or more down-converters to obtain a location of one or more objects whose reflected energy is part of the weighted output from each of the plurality of representative patch antennas.

7. The method according to claim 6, wherein the weighted output, including the reflected energy, from each of the plurality of representative patch antennas is simulated as part of the supervised learning process.

8. The method according to claim 6, wherein the further processing includes filtering, amplifying, and converting using an analog-to-digital converter.

9. The method according to claim 6, wherein the further processing includes using a detection neural network.

10. The method according to claim 6, wherein the implementing the supervised learning process includes obtaining ground truth data indicating the actual location of the one or more objects.

11. The method according to claim 10, wherein the implementing the supervised learning process includes obtaining a loss by comparing the actual location with the location obtained based on the further processing.

12. The method according to claim 11, wherein the implementing the supervised learning process includes updating each selected weight and each selected feedline weight at each iteration over a number of iterations, the number of iterations being based on the loss.

13. A radar system comprising:
    a plurality of patch antennas that are part of a radio frequency (RF) network of the radar system, wherein a relative size of each of the plurality of patch antennas is non-uniform and is based on a supervised learning process implemented by a neural network;
    a plurality of RF feedlines that are part of the RF network and are configured to feed modules to combine outputs from two or more of the plurality of patch antennas to ultimately provide one or more RF network outputs, wherein a thickness of each of the plurality of RF feedlines is non-uniform; and
    processing circuitry configured to detect and locate one or more objects based on reflected signals received by the plurality of patch antennas.

14. The radar system according to claim 13, wherein the thickness of each of the plurality of RF feedlines is based on the supervised learning process implemented by the neural network.

15. The radar system according to claim 14, further comprising one or more down-converters, each of the one or more down-converters being configured to provide a baseband signal based on one of the one or more RF network outputs.

16. The radar system according to claim 15, further comprising one or more digital channels, wherein each of the one or more digital channels includes a power amplifier, a filter, and an analog-to-digital converter and corresponds with one of the one or more down-converters to provide a digital signal based on the baseband signal output by the one of the one or more down-converters.

17. The radar system according to claim 16, wherein the processing circuitry is configured to obtain the location of each of the one or more objects based on the digital signal from each of the one or more digital channels.

18. The radar system according to claim 17, wherein the processing circuitry is configured to implement a second neural network to detect and locate the one or more objects and parameters of the second neural network are updated as part of the supervised learning process implemented by the neural network.

19. The radar system according to claim 14, wherein the radar system is disposed in a vehicle, and the location of each of the one or more objects provided by the radar system is used to control an operation of the vehicle.

20. A vehicle comprising:
a radar system having a plurality of patch antennas that are part of a radio frequency (RF) network of the radar system, wherein a relative size of each of the plurality of patch antennas is non-uniform and is based on a supervised learning process implemented by a neural network;
processing circuitry configured to detect and locate one or more objects based on reflected signals received by the plurality of patch antennas; and
a plurality of RF feedlines that are part of the RF network and are configured to feed modules to combine outputs from two or more of the plurality of patch antennas to ultimately provide one or more RF network outputs, wherein a thickness of each of the plurality of RF feedlines is non-uniform and is based on the supervised learning process implemented by the neural network.

* * * * *